United States Patent [19]

Szemeredi

[11] 4,109,672

[45] Aug. 29, 1978

[54] SNAP-IN VALVE CARTRIDGE

[75] Inventor: Robert S. Szemeredi, Sunland, Calif.

[73] Assignee: Price-Pfister Brass Mfg. Co., Pacoima, Calif.

[21] Appl. No.: 820,396

[22] Filed: Jul. 29, 1977

[51] Int. Cl.² ............................................. F16K 3/10
[52] U.S. Cl. ................................ 137/315; 137/454.2; 403/316; 251/268
[58] Field of Search ................. 137/315, 454.2, 454.6; 403/316, 317, 355, 189; 251/268

[56] References Cited

U.S. PATENT DOCUMENTS

| 963,166 | 7/1910 | Mueller | 403/317 |
|---|---|---|---|
| 3,503,586 | 3/1970 | Bordes | 137/315 X |
| 3,698,418 | 10/1972 | Schmitt | 137/315 |
| 3,788,601 | 1/1974 | Schmitt | 137/454.6 X |
| 3,791,402 | 2/1974 | Shuler | 137/315 |
| 3,897,162 | 7/1975 | Havark | 403/316 X |
| 4,064,900 | 12/1977 | Schmitt | 137/315 |

Primary Examiner—Harold W. Weakley
Attorney, Agent, or Firm—Flam & Flam

[57] ABSTRACT

A connection between a handle and a valve stem is provided by a snap latch arrangement. The usual button at the top of the handle carries a dog bar that prevents the detent from releasing when the button is in place. But when the button is removed, the handle is automatically removable by upward force. No attachment screw need be manipulated. When the handle is removed, a cartridge can be removed. The cartridge includes a frontally facing segment that fits into the cylindrical contour of the valve body cup. The segment is snapped outwardly whereupon the segment, together with associated valve parts can be lifted from the valve cup for repair or replacement.

16 Claims, 10 Drawing Figures

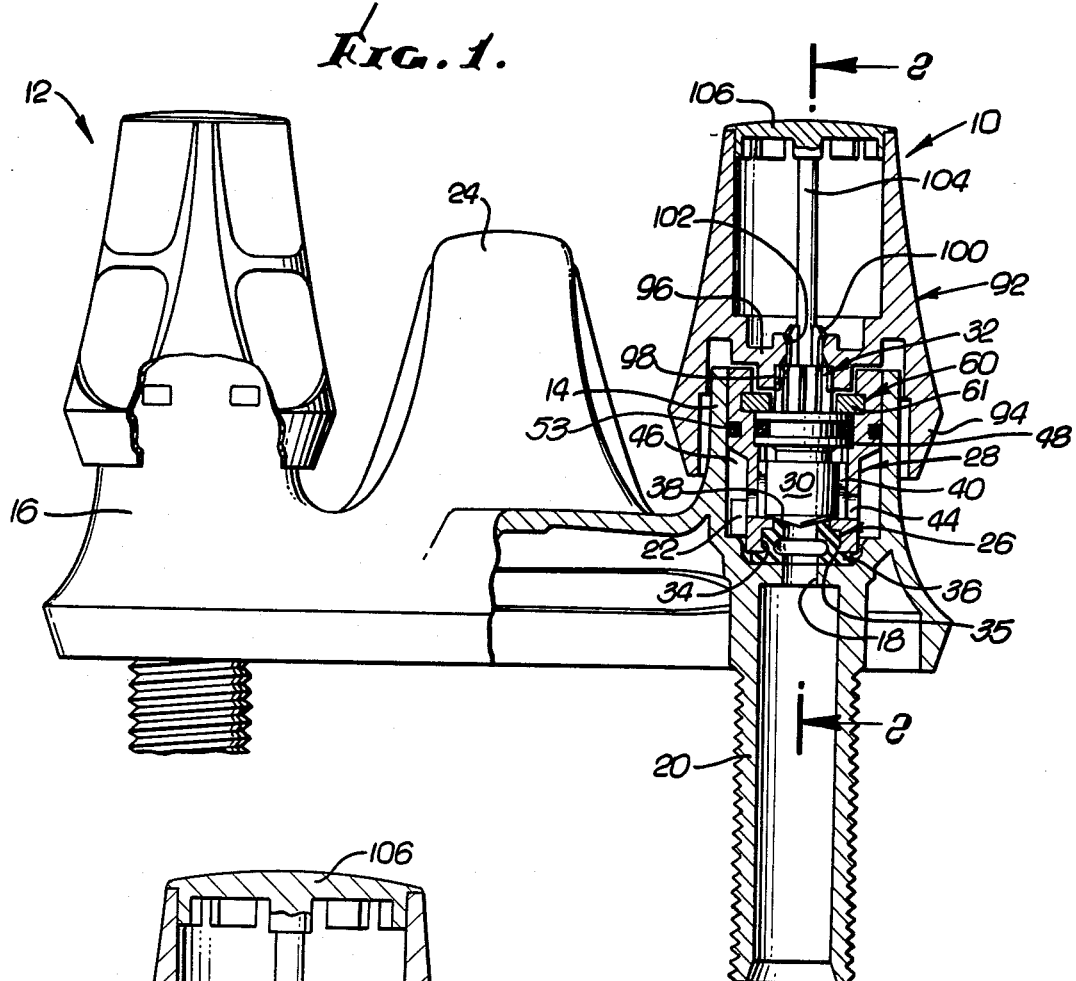
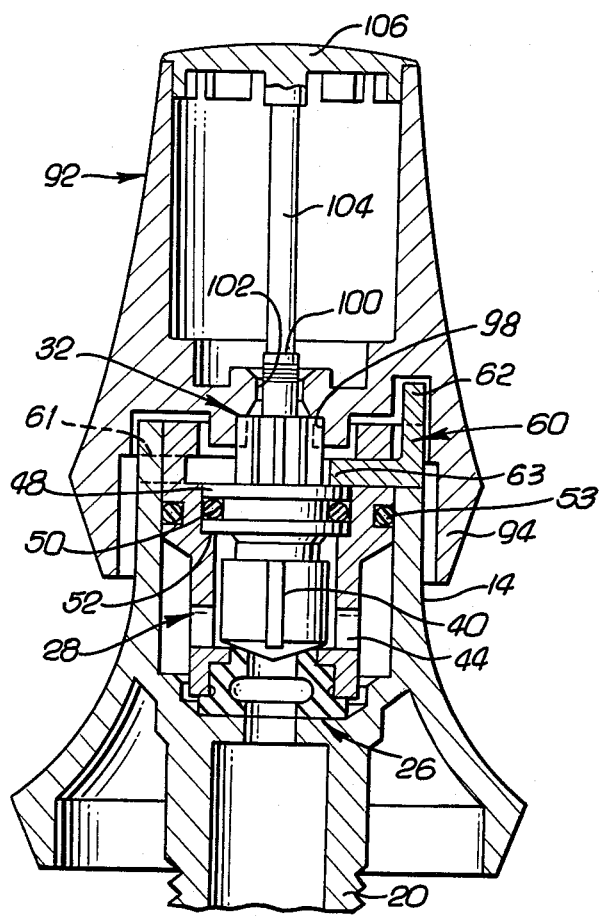

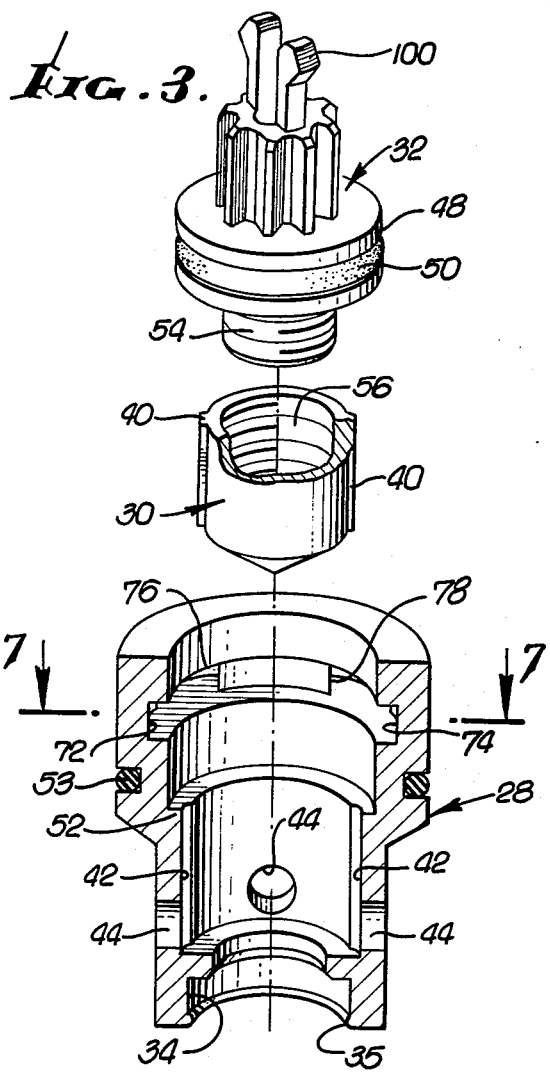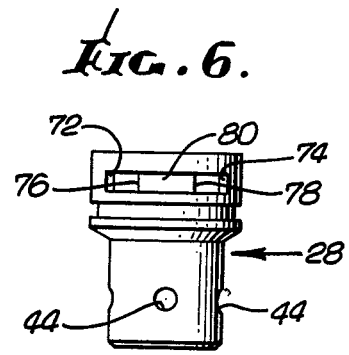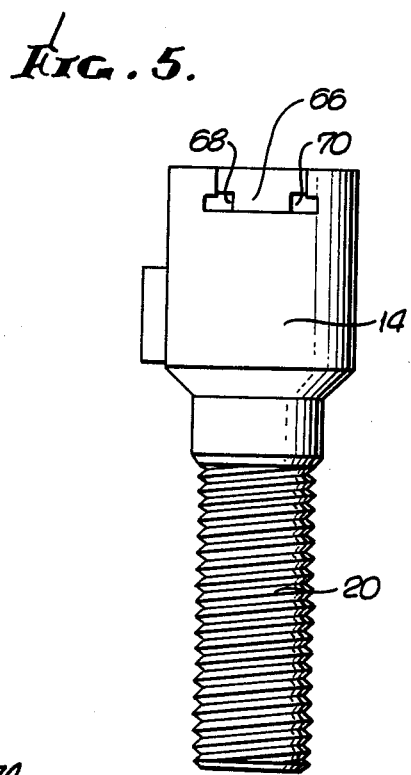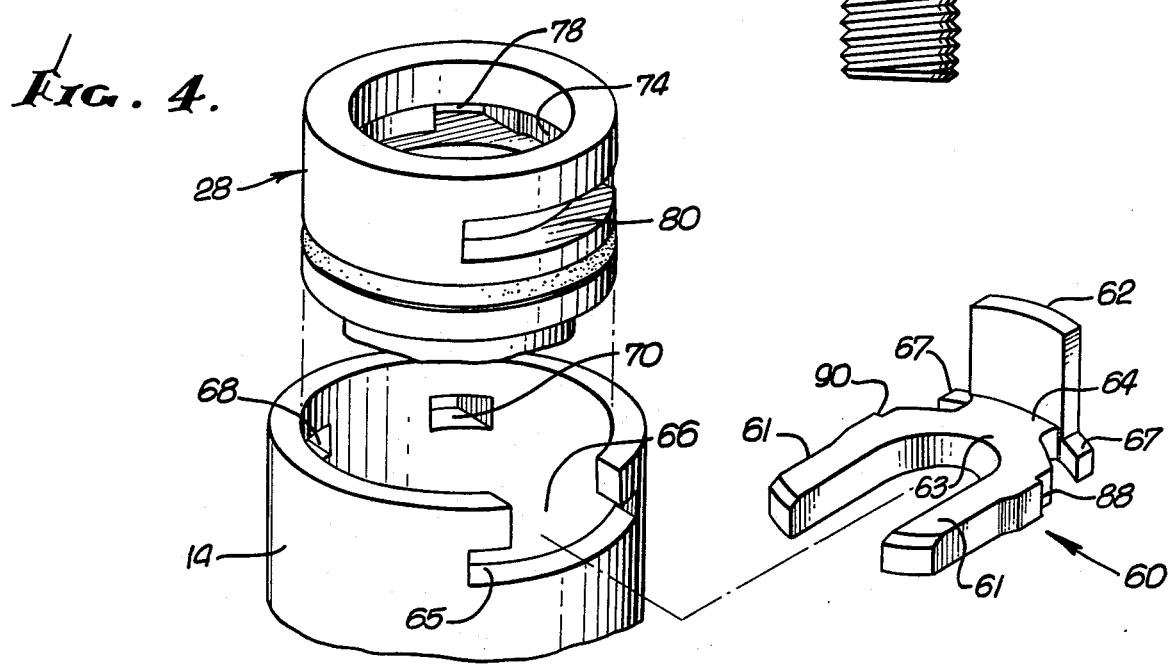

SNAP-IN VALVE CARTRIDGE

FIELD OF INVENTION

This invention relates to plumbing fixtures such as shown and described in U.S. Pat. No. 3,913,612 issued to Julius Tolnai on Oct. 21, 1975 and entitled *ECCENTRIC SHEAR SEAL CARTRIDGE VALVE*. Particularly, this relates to a mechanical system for releasably securing the operative valve parts in position so that they are readily accessible for repair or replacement.

BACKGROUND OF THE INVENTION

The usual operations required for removal of the functional valve parts are: first, detachment of a decorative button from the top of the handle to expose the usual screw that attaches the handle to the valve stem; second, removal of the screw and handle; and third, removal of some screw threaded fastening device, such as a clamp nut from the valve body to release the valve stem and associated parts. The required tools are a screwdriver and a wrench. As simple as the operations may seem, many householders will not attempt the task. Those that do may somehow manage to misuse the tools with consequent injury to person and/or property. An overqualified plumber may be called for what should be a simple do-it-yourself task.

The primary object of the present invention is to provide a fundamentally simple mechanical system for releasably securing the operative valve parts in position so that no mechanic's tools are required.

SUMMARY OF INVENTION

In order to accomplish the foregoing objective, I provide a novel axial detent connection between the knob or handle and the valve stem. The decorative button carries a dog bar normally positioned to prevent the detent from releasing. Just as soon as the decorative button is removed, the detent can be released by upward movement of the knob or handle. The conventional attachment screw is avoided. Once the handle is removed, the valve body is exposed to view. A frontally facing segment of the valve body is now accessible. It is engaged by the finger and snapped to an outward limit to free the valve cage. The valve cage segment and a valve stem in the cage form a three piece cartridge that may now be lifted from the body for replacement. The segment carries a biprong key that attaches the valve stem to the cartridge.

The unique cartridge lock and handle lock are highly advantageous not only for the do-it-yourself householder, but also for the skilled mechanic.

The snap out segment when in place projects above the adjacent rim of the valve body to stop angular movement of the knob or handle as well as to provide a convenient handle to release the cartridge.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 1 is a rear view of a dual valve lavatory fixture incorporating the present invention, the handle for one of the valves being broken away to illustrate the attachment key, the other valve and associated parts being shown in axial section.

FIG. 2 is a sectional view taken along a plane corresponding to line 2—2 of FIG. 1.

FIG. 3 is an exploded pictorial view illustrating the valve cartridge component.

FIG. 4 is an exploded view illustrating the cooperative relationship of the cartridge cage or bonnet, valve body and biprong key.

FIGS. 5 and 6 are side elevational views respectively of the valve body and cage showing the slots for reception.

DETAILED DESCRIPTION OF PREFERRED EMBODIMENT

Figure 7:
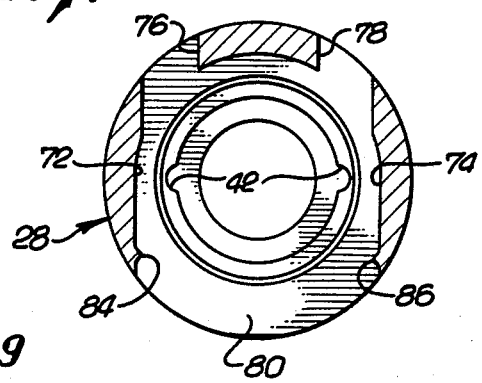
FIG. 7 is a sectional view of the cage alone and taken along the plane indicated by line 7—7 of FIG. 3.

The following detailed description is of the best presently contemplated mode of carrying out the invention. This description is not to be taken in a limiting sense, but is made merely for purposes of illustrating the general principles of the invention since the scope of the invention is best defined by the appended claims.

By way of example, the valve structure embodying the present invention is incorporated in a lavatory fixture having a hot water valve 10 and a cold water valve 12. Since both valves are identical, a detailed description will be made of the hot water valve 10. The valve 10 is accommodated in an upwardly opening recess of a cup 14 provided by the body 16. The bottom of the cup has an axial opening 18 communicating with the conventional hot water supply fitting 20 of the body 16. The cup also has a lateral opening 22 that conducts hot water to a spout 24 under the control of the valve mechanism now to be described.

The valve mechanism in the present example comprises four parts, a bulbous seal member 26, a hollow cage or bonnet 28 that carries the seal member at its lower end, a closure 30 slidable in the cage and an angularly movable actuator or stem 32 for operating the closure 30. The cage 28 is fitted in the valve cup 14 and secured against removal by means hereinafter to be described in detail. The lower end of the cage provides a downwardly facing recess 34 (see also FIG. 3) for accommodating the seal member 26. The seal member has a flange 36 at its lower end that projects laterally beneath the cage to be compressed against the bottom of the valve cup 14 to seal the inlet opening 18. The intermediate part of the seal member is enlarged to snap past a bead 35 at the end of the cage recess (See FIG. 3).

The upper end of the seal member has a lip 38 (FIG. 1) that projects upwardly into the main chamber provided by the cage. The closure 30 is slidably mounted in the cage chamber and prevented from rotation by the aid of ribs 40 (FIG. 3) that fit companion grooves 42 on the inside wall of the cage 28. The closure 30 when advanced, engages the lip 38 to block flow from the supply fitting 20 to the cage interior. When the closure 30 is retracted, the valve opens to permit passage of water through the sealing member, to the interior of the cage 28 and outwardly through ports 44 to an annular chamber 46 (FIG. 1) between the lower end of the cage and the body 16 and then to the lateral body opening 22 to the spout 24.

The stem 32 moves the closure 30 by a lead screw connection. The stem 32 is guided for angular nonrising movement in the cage. Thus, the stem projects into the cage with its upper end provided with a circular flange 48 that fits a companion cage recess. The flange 48 is grooved to accommodate an O-ring 50 (FIG. 2) that provides a seal about the stem. The flange 48 rests upon an upwardly facing shoulder 52 in the cage, whereby the assembled position of parts is determined. The stem or actuator has a lead screw 54 that engages threads 56 formed in a recess at the top of the closure 30. An O-ring 53 in a peripheral groove of the cage seals against the body cup 14.

The stem flange 48 is confined against the cage shoulder 52 and the cage 28 itself is held in the body cup 14 by the aid of a key 60 (FIG. 4). The key 60 has a pair of generally parallel prongs 61 that project from the base of an arcuate segment 62. The arcuate connecting portion 63 of the key 60 is joined to the arcuate segment 62 by a narrow neck 64. As shown in FIGS. 4, 5 and 6, the key 60 fits the valve cup 14 as well as the cage 28. An inverted T-shaped slot 66 located frontally of the valve cup 14 precisely accommodates the segment 62, and the undercut sides 65 of the slot accommodate ears 67 that project outwardly from the lower end of the segment.

Figure 9:
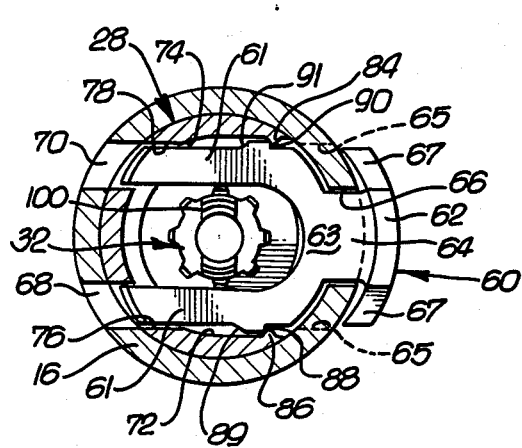
FIG. 9 is a transverse sectional view taken along the plane corresponding to line 9—9 of FIG. 8.

The prongs 61 extend across the cup to individual slots 68 and 70 at the rear of the cup 14 (See also FIGS. 5 and 9). The interengagement of the segment 62 with the T-slot 66 to the body and the interengagement of slots 68 and 70 lock the key against upward movement.

The prongs 61 also interlock the cage or bonnet 28 as shown in FIGS. 3, 4, and 9. Thus, the prongs 61 extend along interior cage slots 72 and 74 (FIG. 4) located on opposite sides of the cage recess. The slots terminate at individual openings 76 and 78 (FIGS. 3 and 6) for the prong ends. The openings 76 and 78 register with the cup slots 68 and 70. At the front of the cage, the slots 72 and 74 terminate at opposite ends of a circumferential slot 80 (FIGS. 6 and 7) that accommodates the neck 64 and connecting portion 63 of the key 60 as shown in FIG. 2. When assembled, the key secures the cage against upward movement. Furthermore, as shown in FIGS. 1 and 2, the prongs overlie the stem flange 48, confining the stem flange 48 against the cage shoulder 52.

Figure 8:
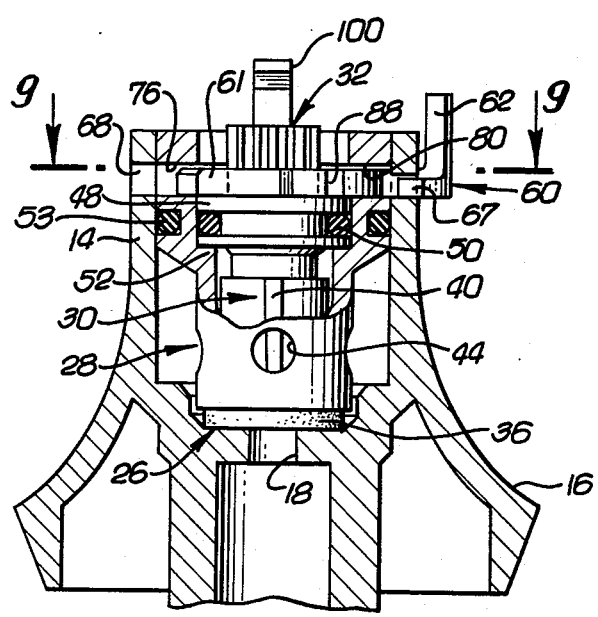
FIG. 8 is an enlarged fragmentary sectional view similar to FIG. 2, but showing the handle removed and the snap-out segment in its released position.
Figure 8A:
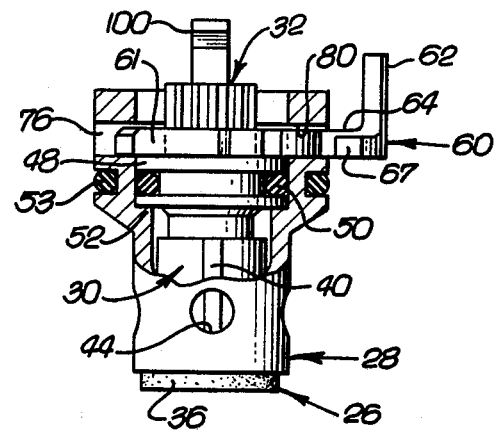
FIG. 8A is a side elevational view companion to FIG. 8 illustrating the cartridge subassembly ready to be inserted into the body cup.

The key 60, cage 28, valve closure 30 and stem 32, comprise a cartridge or subassembly shown in FIG. 8A. With the key in its outer released position illustrated in FIG. 8A (corresponding to that shown in FIGS. 8 and 9), the cartridge can be moved into the cup recess. Thus, the ends of the prongs 61 are withdrawn into the cartridge slots 76 and 78 to provide clearance at the rear of the cup 14. The connecting portion 63 at the proximal ends of the prongs is positioned to provide clearance with the front of the cup 14 with the neck 64 registering with the top of the inverted T-shaped slot 66. The arcuate segment 62 and the ears 67 are positioned to clear along the outside of the cup.

After the cartridge is inserted (FIGS. 8 and 9), the segment 62 is pushed inwardly. The parts fit into place as shown in FIGS. 1 and 2. When the cartridge is to be replaced, the segment 62 is pulled outwardly. A detent arrangement stops the outward movement of the segment at the proper place whereby the parts can be removed without interference. For this purpose, the cage slots 72 and 74 have inwardly extending detents 84 and 86 (FIG. 9) that are engaged rearwardly facing shoulders 88 and 90 on the outside edges of the prongs 61. The detents will, upon exertion of a very strong force, cam the prongs 61 inwardly until the shoulders ride over the detents. However, separation of the key 60 from the cage is not intended before the cartridge is removed as a unit. Outward movement of the key is thus also prevented by virtue of the fact that the thickness of the prongs 61 and central connection portion 63 is greater than that of the slot 66.

After the cartridge is removed (FIG. 8A), the parts can be disassembled by exertion of sufficient force on the segment 62. Assembly, however, requires only slight force. For this purpose, the prong sides have ramps 89 and 91 (FIG. 9) that easily expand the walls along the slots 72 and 74 as the prongs move past the detents 84 and 86. The segment 62 is exposed frontally of the valve body only when the operating knob 92 is removed. Thus, the knob 92 has a peripheral skirt or flange 94 (FIG. 2) that normally overlies the segment 62 and that normally surrounds the upper portion of the body cup 14. The knob 92 has an intermediate partition wall 96 that provides a splined recess 98 to receive the correspondingly splined upper end of the actuator or stem 32 whereby a coupling is provided. The stem end has a series of equiangularly spaced spring fingers 100 that extend through an opening 102 in the wall that snap over the top edges of the opening 102 to provide an axially separable coupling between the knob and the stem. This snap connection is normally separable by exerting a slight upward pull on the knob to cause the fingers 100 to constrict. However, the connection is made secure by a rod 104 that extends between the spring fingers 100 to prevent such constriction.

The rod 104 is formed as part of the button 106 that attaches to the top of the knob, preferably by a snap action. As long as the button 106 is in place, the knob 92 is positively locked to the stem. However, just as soon as the button 106 is detached from the knob, the knob is freed whereby access is provided to the key 60 for removal of the cage and its associated parts. The uninstructed do-it-yourself householder may be pleasantly surprised by the knob 92 being loose or readily separable. Simple instructions and diagrams accompanying a replacement cartridge should readily be understood. The knob 92 has an abutment that cooperates with the key segment 62 to limit angular movement of the knob and thus axial movement of the valve actuator. The spline connection between the knob and the stem can be established only after the abutment is properly positioned relative to the segment 62.

No mechanic's tools are required either to assemble or disassemble the entire valve structure. At best, a knife or other convenient implement may be required to unfasten the button 106.

Intending to claim all novel, useful and unobvious features shown or described, I make the following claims:

1. In a plumbing fixture:
   a. a valve body;
   b. a valve mechanism supported by the body including a valve stem;
   c. a handle for operating the valve stem;
   d. an axially separable coupling between the handle and the valve stem;
   e. a button snap connected to said handle; and f. a dog member carried by the button and locking said axially separable coupling against separation when said button is in place on said handle.

2. In a plumbing fixture:
 a. a valve body having a cup providing a valve recess;
 b. a valve mechanism in the recess including a non-rising valve stem projecting upwardly of the recess;
 c. a hollow handle for operating the valve stem and having a skirt encompassing the valve body cup;
 d. companion axially separable snap coupling members carried respectively at the end of the stem and on the inside of said handle, one of said coupling members being movable radially upon axial separation there between; and
 e. a dog member releasably mounted at the top of said handle and having a part positioned to restrict radial movement of said one of said coupling members whereby said stem and said handle are secured together for conjoint angular movement.

3. The combination as set forth in claim 2 together with a button releasably closing an opening at the top of said handle, said dog member being attached to said button.

4. The combination as set forth in claim 2 in which said handle has a wall extending across the interior thereof, said wall having an opening aligned with said stem, said stem having a plurality of spring fingers projecting through the wall opening for snap connection with the upper edges of said wall opening, said dog member projecting between said spring fingers to lock them against separation from said handle wall.

5. In a plumbing fixture:
 a. a valve body having a cup providing a valve recess;
 b. said cup having a wall part interrupted at its top by a slot;
 c. valve cartridge adapted to fit in said cup, said valve means including a key carried thereby and movable laterally of the valve means between a released position and a locked position;
 d. said key having an outer segment complementary to said cup wall slot and having a neck joining the prong means and said segment;
 e. said neck of said key, when the key is in a released position, being movable along said slot as said valve cartridge means moves into said cup and as said segment moves along the outside of the cup;
 f. said key segment being movable radially inwardly to interlock said slot to secure said valve means against upward movement.

6. The combination as set forth in claim 5 in which said key also has prong means opposite said segment and in which said cup wall has slot means cooperable with said prong means releasably to interlock said valve means in said cup when said key is moved to said locked position.

7. The combination as set forth in claim 5 in which said valve means includes a cage, a non-raising valve stem, a seal means at the bottom of said cage engageable with the bottom of said cup and a closure member in the cage and operated by said stem to work against said seal means.

8. The combination as set forth in claim 5 in which said valve means includes a hollow cage, said cage providing a recess, a non-rising stem in said cage recess, said key having prongs slidably accommodated in interior grooves of the cage and fitting about said stem to confine said stem in said cage both in the released and locked position of said key.

9. The combination as set forth in claim 8 together with a yielding detent stop between said key prongs and said cage recess and operative releasably to determine the said released position of said key.

10. The combination as set forth in claim 9 together with ramp means for moving said key past said detent upon initial assembly of said key with said cage.

11. The combination as set forth in claim 9 in which said key has a size to be stopped by said cup slot in the event that said detent stop yields.

12. The combination as set forth in claim 5 in which said segment projects above the edge of said cup wall, together with a handle overlying said cup, an axially separable connection between said handle and said valve means and operative to couple said valve means to said handle for angular movement of a part of said valve means, said handle having internal stops cooperating respectively with opposite sides of the upwardly extending part of said segment to limit movement of said valve means part.

13. The combination as set forth in claim 12 in which said part is a non-rising stem, said handle being hollow and having a wall extending across the interior thereof, said wall having an opening aligned with said stem, said stem having a plurality of spring detent fingers projecting through the wall opening for releasable spring connection with the upper edges of said wall opening, and a dog member releasably mounted at the top of said handle and having a part projecting between said spring fingers to prevent axial separation of said handle from said stem.

14. In a plumbing fixture:
 a. a valve body having a cup providing a valve recess, there being a fluid inlet at the bottom of said cup;
 b. said cup having a wall part, there being a slot extending downwardly from the top edge of said cup, said slot having a reentrant party, said cup also having recess means opposite said slot;
 c. valve cartridge means adapted to fit in said cup, said valve means including a hollow cage, a non-raising valve stem angularly movable in the cage, a hollow seal means carried at the bottom of the cage for engagement with the bottom of said valve body cup about said inlet, said seal means being exposed at the bottom of said cup to form a passage for flow into said cage, said valve means also including a closure guided in the cup to close and open said hollow seal means;
 d. a key having prongs accommodated respectively in substantially parallel interior grooves of said cage to guide said key for movement transverse to said cage, said prongs fitting about said stem to confine said stem in said cage, said key having a segment conforming to the configuration of said cup wall slot, said key having a neck joining said segment to said prongs;
 e. a yielding detent stop between said key prongs and said cage and operative releasably to determine a released and a locked position of said key in which said prongs are withdrawn into and project beyond said cage respectively, and in both of which positions said stem is confined by said prongs;
 f. said key in the locked position having its prongs engaging said recess means in said cup and said segment interlocked with said slot to secure said valve cartridge means against separation from said valve body cup, said neck, in the released position of said key being movable along said cup slot as said valve means moves along said cup and said segment moves along the exterior of said cup.

15. The combination as set forth in claim 14 in which said key prongs are provided with ramps for moving said key past said detent means upon initial assembly of said key with said cage.

16. The combination as set forth in claim 15 in which said segment projects above the edge of said cup wall, and together with a hollow handle having a skirt overlying said cup, said handle having a wall extending across the interior of the handle and providing an opening aligned with said stem, said stem having a plurality of spring detent fingers projecting through the wall opening for releasably spring connection with the upper edges of said wall opening, and a dog member releasably mounted by a button at the top of said handle and having a part projecting between spring fingers to prevent axial separation of said handle from said stem, said handle having a groove receiving said upwardly extending part of said segment to determine stops to the angular movement of said handle and said stem.

* * * * *